United States Patent

Bladt et al.

[11] Patent Number: 5,589,551
[45] Date of Patent: Dec. 31, 1996

[54] SWELL REDUCTION OF CHROMIUM CATALYZED HDPE RESINS BY CONTROLLED DEGRADATION USING HIGH TEMPERATURE PEROXIDES

[75] Inventors: John P. Bladt, Plainfield; Pradeep P. Shirodkar, Belle Mead, both of N.J.

[73] Assignee: Mobil Oil Corporation, Fairfax, Va.

[21] Appl. No.: 391,858

[22] Filed: Feb. 22, 1995

[51] Int. Cl.$^6$ ............................ C08J 3/24; C08L 23/26
[52] U.S. Cl. .................. 525/333.8; 525/387; 428/36.92
[58] Field of Search ............................. 525/333.8

[56] References Cited

U.S. PATENT DOCUMENTS

| | | | |
|---|---|---|---|
| 3,376,238 | 4/1968 | Gregorian | 260/2.5 |
| 3,622,554 | 9/1969 | Behr et al. | 260/2.5 |
| 3,631,161 | 12/1971 | Fan et al. | 260/94.9 |
| 3,764,628 | 10/1973 | Gregorian et al. | 260/610 R |
| 3,923,947 | 12/1975 | Cook | 264/141 |
| 4,006,283 | 2/1977 | MacKenzie, Jr. et al. | 526/57 |
| 4,015,058 | 3/1977 | Schober | 526/57 |
| 4,202,790 | 5/1980 | Steller | 252/186 |
| 4,226,905 | 10/1980 | Harbourne | 428/220 |
| 4,390,666 | 6/1983 | Moriguchi et al. | 525/194 |
| 4,460,750 | 7/1984 | Thiersault et al. | 525/333.8 |
| 4,465,812 | 8/1984 | Moriguchi et al. | 525/333.8 |
| 4,486,579 | 12/1984 | Machon et al. | 526/65 |
| 4,578,431 | 3/1986 | Shaw et al. | 525/387 |
| 4,603,173 | 7/1986 | Mack et al. | 525/194 |
| 4,614,764 | 9/1986 | Colombo et al. | 525/193 |
| 4,737,547 | 7/1988 | White | 525/193 |
| 5,073,598 | 12/1991 | Anzini | 525/193 |
| 5,096,947 | 3/1992 | Bohen et al. | 524/58 |

OTHER PUBLICATIONS

Kirk–Othmer–Ency. Chem. Tech.–Third Ed. Vol. 16–1981 pp. 421–449.

*Primary Examiner*—Carman J. Seccuro, Jr.
*Attorney, Agent, or Firm*—Ronald A. Bleeker; Dennis P. Santini; Marina V. Schneller

[57] ABSTRACT

Blends of HDPE, peroxides and antioxidants exhibit reduced die swell which in bottle blow molding decreases bottle weight.

8 Claims, No Drawings

SWELL REDUCTION OF CHROMIUM CATALYZED HDPE RESINS BY CONTROLLED DEGRADATION USING HIGH TEMPERATURE PEROXIDES

FIELD OF THE INVENTION

The invention relates to high density polyethylene blended with peroxides to reduce swell of high density polyethylenes on blow molding.

BACKGROUND OF THE INVENTION

Swell characteristics play an important role in determining the processability of HDPE blow molding resins. Often the intrinsic swell of chromium catalyzed resins is so high that it contributes to unacceptably high bottle weight. One option for lowering the swell of such resins is to degrade them in the presence of air along with high stresses and temperature. The disadvantage of this approach is the inability to simultaneously incorporate antioxidants (which are affected by the air) and also degrade the HDPE to reduce the swell. The use of the high temperature peroxides disclosed in this invention allows incorporation of antioxidants and at the same time degrade the polyethylene by controlled degradation of low levels of peroxides. The key concept in the invention is to use peroxides that decompose fast enough for degradation/crosslinking to be accomplished before the antioxidants are able to scavenge the free radicals generated by the peroxides. The HDPE resins modified in such a manner not only have the desired structural modifications but they also have well dispersed antioxidants which makes them suitable for blow molding applications.

SUMMARY OF THE INVENTION

Compositions comprising HDPE (high density polyethylene), peroxides described below and antioxidants provide the art with an option to simultaneously crosslink and stabilize the HDPE resins. The swell characteristics of chromium catalyzed HDPE blow molding resins is reduced by the addition of very low levels of high temperature peroxides.

DETAILED DESCRIPTION OF THE INVENTION

The modified ethylene polymer (or copolymer) of this invention is capable of being blow molded into articles, e.g., bottles, with reduced weight swell.

The amount of peroxide used to treat the HDPE to decrease the swell in this invention can range from 10 to 1000 ppm. However, preferably, the peroxide amount ranges from 10 to 500 based on the HDPE weight. Most preferably, the peroxide of the blend is about 10–300 ppm.

The types of peroxides which are used are high temperature peroxides that can undergo almost complete decomposition at normal compounding temperatures (190–260° C.). The half life temperature at 0.1 hours should be greater than 130° C. Half life temperature is the temperature at which one half of the peroxide has decomposed. Suitable but non-limiting examples of such peroxide are: dicumyl peroxide, 2,5-dimethyl-2,5-di-(tert butyl peroxy) hexane, tert-butyl cumyl peroxide, di-(2-tert-butylperoxy-isopropyl) benzene, di-tert-butyl peroxide, 2,5-dimethyl-2,5-di-(tert- butylperoxy)hexyne-3, cumene hydroperoxide these contain 2 to 20 carbon atoms. The peroxide treated HDPE may be blended usuing any of various methods known in the art.

High density ethylene polymers and copolymers (HDPE) used in this invention are homo polymers and copolymers of ethylene which exhibit a density of 0.94 to 0.97 g/cc, preferably 0.947 to 0.965 g/cc. These polymers may be ethylene homopolymers or ethylene copolymers of alpha-olefins containing a minor amount, preferably about 0.1 to 25 mole percent of an olefin, preferably a 1-olefin, containing 3 to 10 carbon atoms, e.g., 1-propene, 1-butene, 1-pentene, 1-hexene, 4-methyl-1-pentene, 1-heptene, and 1-octene. The preferred olefin comonomers are 1-butene, 1-hexene and 1-octene.

The flow index or high load melt index of the HDPE ($I_{21}$, measured at 190 degrees C. in accordance with ASTM D-1238, Condition F) is generally at least about 2, preferably from about 5 to 50 and most preferably about 5 to 40 g/10 min., while the melt flow ratio MFR, defined as the ratio of flow index (21) to melt index ($I_2$), measured at 190° C. in accordance with ASTM D-1238, Condition E, is at least about 60, preferably about 70 to 300, and most preferably about 80 to 200.

The HDPE may be prepared by any of various methods known in the art, preferably in the presence of chrome containing catalysts described in U.S. Pat. Nos. 2,825,721, 3,324,101 and 5,096,868, which are relied upon and incorporated by reference herein. The catalysts contain titanium, chromium, magnesium, and admixtures thereof which give rise to the catalyst residues in the as-polymerized [as-synthesized] resin. The as-synthesized HDPE will contain 0.01 to 20, preferably 0.1 to 5 ppm of Cr (elemental).

These catalysts are especially suitable for producing copolymers of ethylene and $C_3$–$C_{10}$ alpha olefins in a gas phase, fluid bed reactor at temperatures less than 108° C., and at pressures of less than 400 psi, to produce granular polymer resins having acceptable HLMI values of about 5–50.

The peroxide treated HDPE may be prepared using any of various methods known in the art. For example, the two components may be melt or dry blended and the blend added directly to a blow molding machine.

The amount of peroxide used to treat the HDPE to decrease the swell in this invention can range from 10 to 1000 ppm. However, preferably, the peroxide amount ranges from 10 to 500 ppm based on the HDPE weight. Most preferably, the peroxide of the blend is about 10–300 ppm.

The types of peroxides which are used are high temperature peroxides that can undergo almost complete decomposition at normal compounding temperatures (190°–260° C.). The half life temperature at 0.1 hours should be greater than 130° C. Half life temperature is the temperature at which one half of the peroxide has decomposed. Suitable but non-limiting examples of such peroxide are: dicumyl peroxide, 2,5-dimethyl-2,5-di-(tert butyl peroxy) hexane, tert-butyl cumyl peroxide, di-(2-tert-butylperoxy-isopropyl) benzene, di-tert-butyl peroxide, 2,5-dimethyl-2,5-di-(tert-butylperoxy)hexyne-3, cumene hydroperoxide these contain 2 to 20 carbon atoms. The peroxide treated HDPE may be blended using any of various methods known in the art.

The die swell is measured by a technique similar to that outlined in the *Proceedings of the SPE 48th Annual Technical Conference*, (1990), pages 1612–1616. This swell measurement has excellent correlation to bottle weight in blow molding.

As a result of the treatment the swell of the HDPE is decreased compared to untreated HDPE, without any peroxide. ADS (annular die swell) decrease is determined as a percentage reduction compared to the untreated HDPE. In the peroxide treated HDPE, the numerical values of this decrease is in the range of 3 to 50, preferably 3 to 20.

Changes in MFR and swell reduction and ranges of amounts of peroxide, in accordance with the invention are tabulated below:

|           | % MFR Increase | % Swell Reduction | Peroxide ppm |
|-----------|----------------|-------------------|--------------|
| Broad     | 20–500         | 3–50              | 10–1000      |
| Narrow    | 20–200         | 3–30              | 10–500       |
| Preferred | 30–100         | 3–20              | 10–300       |

The blend may also contain any of various additives conventionally added to polymer compositions for different purposes, e.g. stabilizers such as antioxidants, pigments, etc.

The results of the invention can be realized with peroxides as the sole agents to decrease ADS; accordingly, the HDPE blend with the small amounts of peroxide are to be construed to exclude of other reagents for effecting reduction when the language "consisting essentially of" or "consisting of" is employed.

The following examples further illustrate the invention.

EXAMPLES

Chromium catalyzed HDPE blow molding resins were melt compounded with a minor amount (less than 1 percent) of a high temperature peroxide (Trigonox 101 manufactured by Akzo). The amount of peroxide is determined by the desired extent of swell reduction.

EXAMPLE 1

HDPE granular resins produced by Silyl Chromate catalyst (as described in U.S. Pat. No. 3,324,101) were melt compounded at 220° C. in a ¾ inch Brabender Twin screw extruder along with 300 ppm of Irganox-1010 as stabilizer. The following table shows the reduction in swell (ADS) with the addition of low levels of peroxide.

| Sample          | Screw RPM | MI   | FI   | MFR | ADS  | % Swell Reduction |
|-----------------|-----------|------|------|-----|------|-------------------|
| Resin A         | 65        | .346 | 30.5 | 87  | 1.02 | —                 |
| A + 100 ppm perox. | 65     | .071 | 14.9 | 211 | 0.82 | 19.6              |
| Resin B         | 30        | .263 | 22.2 | 88  | .87  | —                 |
| B + 150 ppm perox. | 30     | .039 | 11.0 | 285 | .74  | 14.9              |

Resin A and B represent different feedstocks. In both cases, addition of peroxide reduced the swell as measured by ADS. The crosslinking affect of the peroxide is also evident in the increased MFR.

EXAMPLE 2

HDPE granular resin produced by a modified chrome oxide catalyst (U.S. Pat. No. 5,096,868) were compounded on a Farrel compounder (4LMSD) with a specific energy input of 0.12 HP/lb at a temperature of 227° C. The pelletized samples containing 500 ppm Irganox 1076 were blown into bottle on the IMPCO blow molding machine. The swell characteristics of the resins were measured in terms of the net bottle weight at a fixed drop time of 2.5 seconds.

| Sample | PPM Peroxide | MI  | FI | MFR | ADS  | Net Bottle Weight | % Swell Reduction |
|--------|--------------|-----|----|----|------|-------------------|-------------------|
| 1      | 0            | .56 | 44 | 80  | .875 | 31.1 gms          | —                 |
| 2      | 100          | .27 | 33 | 123 | .845 | 29.7 gms          | 4.5               |

The peroxide and the antioxidant were injected at the feed throat. The peroxide treated samples had lower swell as measured by both ADS and bottle weight. The effect of peroxide is also manifested in substantial increase in MFR.

The use of highly active high temperature peroxide allow us to simultaneously crosslink and stabilize the resultant resins. In the air initiated degradation, the radical generation processes is so slow that in the presence of any antioxidants the crosslinking reaction is very limited. The latter is shown by the higher swell of the resins containing no peroxides.

Thus it is apparent that there has been provided, in accordance with the invention, a blend, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A modified high density polyethylene formed from a mixture comprising
   a chromium catalyzed high density (0.94 to 0.97 g/cc) polymer of ethylene or copolymer of ethylene and an alpha olefin of 4 to 10 carbon atoms, containing 0.1 to 10 ppm Cr (elemental), and 10 to 1000 ppm of a high temperature peroxide with a half life temperature at 0.1 hours which is greater than 130° C.
wherein the modified high density polyethylene exhibits at least 30 percent increase in MFR because of crosslinking, and swell reduction determined by annular die swell in the range of 3 to 50 when compared to a base resin comprising said polymer or copolymer and free of peroxide.

2. The modified high density polyethylene of claim 1, wherein the copolymer comprises a monomer selected from the group consisting of 1-butene, 1-hexene and 1-octene.

3. The modified high density polyethylene of claim 1, wherein the percent MFR increase is 20 to 500; the percent swell reduction is 3 to 50; and the peroxide (ppm) is 10 to 1000.

4. The modified high density polyethylene of claim 1, wherein the percent MFR increase is 20 to 200; the percent swell reduction is 3 to 30; and the peroxide (ppm) is 10 to 500.

5. The modified high density polyethylene of claim 1, wherein the percent MFR increase is 30 to 100; the percent swell reduction is 3 to 20; and the peroxide (ppm) is 10 to 300.

6. In a process for blow molding containers which comprises blow molding chromium catalyzed high density (0.94 to 0.97 g/cc) polyethylene which exhibits high die swell, the improvement comprising providing the high density polyethylene as a modified high density polyethylene in accordance with claim 1 whereby there is obtained a container of a weight less than the weight of a container produced with the high density polyethylene which exhibits high die swell.

7. The process of claim 6, wherein with respect to the modified high density polyethylene the MFR increase is 30 to 200 percent; with a percent swell reduction is 3 to 30; and the peroxide (ppm) is 10 to 500.

8. The blend of claim 6, wherein with respect to the modified high density polyethylene the MFR increase is 30 to 100 percent; with a percent swell reduction which is 3 to 20; and the peroxide (ppm) is 10 to 300.

* * * * *